No. 886,432. PATENTED MAY 5, 1908.
J. S. SOUTHERDEN.
LINE SPACER FOR TYPE WRITING MACHINES.
APPLICATION FILED FEB. 20, 1906.
2 SHEETS—SHEET 1.
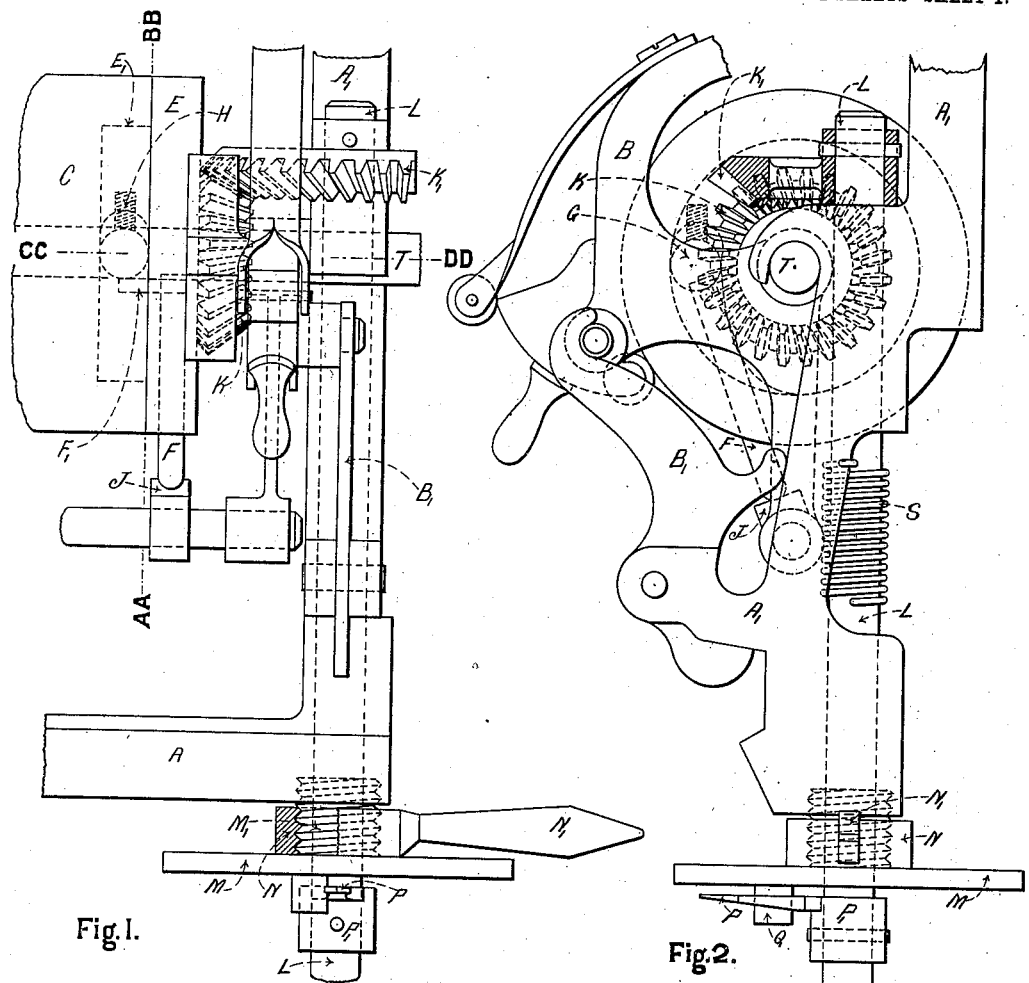
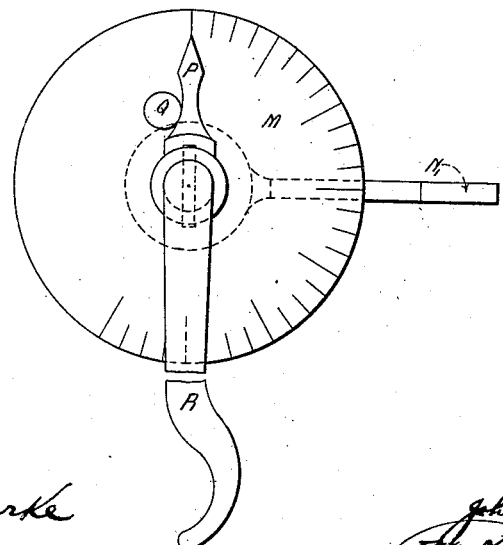
Fig. 3.
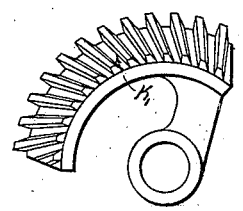
Fig. 4.
WITNESSES:
W. P. Burke
W. J. Donovan
INVENTOR.
John Stephen Southerden
E. Richards
ATTYS.

No. 886,432. PATENTED MAY 5, 1908.
J. S. SOUTHERDEN.
LINE SPACER FOR TYPE WRITING MACHINES.
APPLICATION FILED FEB. 20, 1906.

2 SHEETS—SHEET 2.

WITNESSES:
W. P. Burke
W. J. O'Donovan

INVENTOR,
John Stephen Southerden
BY Richardson
ATTYS.

UNITED STATES PATENT OFFICE.

JOHN STEPHEN SOUTHERDEN, OF BRISBANE, QUEENSLAND, AUSTRALIA.

LINE-SPACER FOR TYPE-WRITING MACHINES.

No. 886,432.  Specification of Letters Patent.  Patented May 5, 1908.

Application filed February 20, 1906. Serial No. 302,093.

*To all whom it may concern:*

Be it known that I, JOHN STEPHEN SOUTHERDEN, a subject of the King of the United Kingdom of Great Britain and Ireland, and resident of 159 Queen street, Brisbane, in the State of Queensland, Commonwealth of Australia, have invented certain new and useful Improvements in Line-Spacers for Type-Writing Machines, of which the following is a specification.

This invention relates to a device for rotating the platen whereby the space between the lines of type-writing is not limited to fixed distances but adjustable to any desired distance within the operating range of the device, and consists of a flanged collar fixed to the end of the platen, rotating within which is the boss of a disk, in the periphery of the boss is a tapered recess for receiving a ball, roller, eccentric, or any form of wedge which is arranged by adjustment to engage with the fixed ring forming a rigid compact.

To insure engagement of the ball with the outer ring, a small spiral spring fits in a hole drilled in the boss opposite the end of the recess and to break the engagement is a piston working in a hole in the disk to the end of which is fixed a pin say at right angles which when engaged with the ball, breaks the contact with the fixed ring and allows the boss and disk to rotate free.

The piston projects beyond the periphery of the disk and contacts with a stop on the frame of the machine, its travel is limited by a slot and pin. This piston may be substituted by a trigger as hereinafter described.

Secured to the face of the free disk is a skew bevel toothed wheel operated by a skew bevel segment.

The device is shown as applied to a Smith Premier type-writing machine and a means of thus operating the device, the operating mechanism however will vary according to the type of machine to which it is applied.

Reference is now made to the drawings forming part of this specification in which:—

Figure 7:
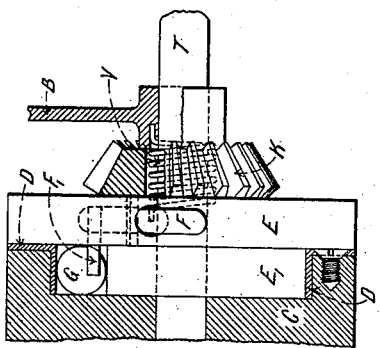
Figure 9:
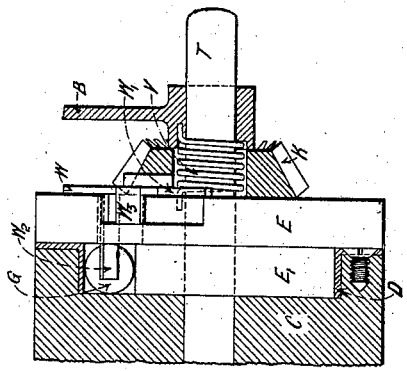
Figure 6:
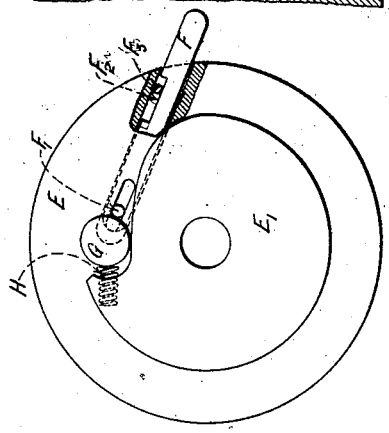
Figure 8:
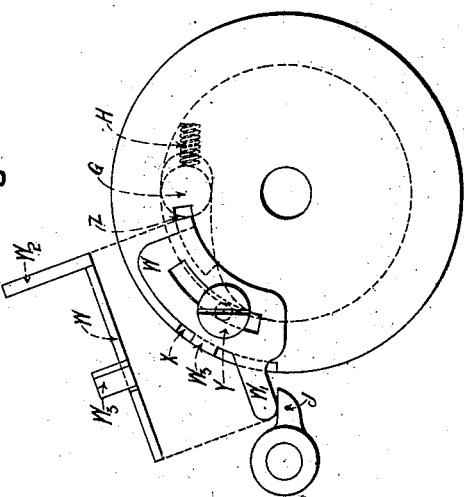
Figure 5:
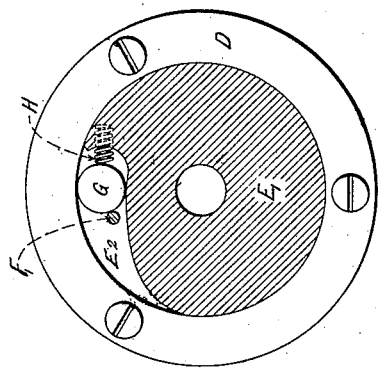

Figure 1 is a broken plan of machine with device attached. Fig. 2 end view of same. Fig. 3 front elevation of adjustable dial. Fig. 4 front elevation of skew bevel segment. Fig. 5 section through A A, B B Fig. 1. Fig. 6 internal face view of free disk. Fig. 7 section through C C, D D Fig. 1 with front elevation of free disk. Fig. 8 end elevation of free disk with skew bevel wheel removed, showing modified device for operating the ball. Fig. 9 sectional view of modified device.

The reference letters indicate like parts in all figures.

A is the front of the frame of the machine and $A^1$ the side or one end.

B is the frame attached to the platen and carrying the existing brake mechanism; $B^1$ the releasing hook to free the platen and platen frame B; C the platen, D a flanged collar let in and screwed on to the end of the platen, E a disk with a boss $E^1$ fitting into the collar D and $E^2$ a tapered recess in the boss $E^1$.

F is a piston working in a hole in disk E and $F^1$ a pin on end of piston engaging with ball G; $F^2$ a slot in piston and $F^3$ a pin to limit its travel; H is a light spiral spring pressing the ball into contact with the collar D, which does not take place until the spring is extended thus allowing the disk E to move freely.

J is a stop on frame of machine against which the end of the piston F abuts.

K is a skew bevel toothed wheel secured to the end of the disk E, and $K^1$ skew bevel segment pinned or keyed on to the operating lever L and engaging with the skew bevel wheel K.

M is a dial with a threaded screw $M^1$ formed integrally with the same which screws into the frame A, N a lock nut with handle $N^1$ which on turning against frame A locks dial in position desired.

P is the dial pointer formed integrally with the collar $P^1$ pinned on to the lever L.

Q is a stop, R lever handle, and S spiral spring fastened to frame of machine and to lever L for bringing back the latter into rest position.

T is the spindle of the platen.

V is a spiral spring around the platen spindle and within the hole of the skew bevel wheel K, one end is fastened to the disk E and the other end to the frame B the spring brings the skew bevel wheel K to its rest position on releasing the operating lever.

In the modified device as shown in Figs. 8 and 9, W is a slotted trigger constrained to run within its travel limit concentrically with the disk and held thereto by set screw Y. $W^1$ projecting foot abutting against stop J. $W^2$ an arm at right angles inserted in a slot through the face of the disk for releasing ball from gripping. W³ lug at right angles traveling round rim of disk within the limit of its travel controlled by length of slot on rim of disk.

The slot on rim of disk is indicated by letter X and the slot on face of disk by letter Z.

When at rest and the projecting end of the piston or trigger is in contact with the stop on the frame of the machine the ball is pushed out of engagement with the fixed collar allowing free movement of the platen.

In operating the invention the dial is set to the space required allowing the pointer to travel from the rest position to the stop on the dial, the lever handle is manipulated in the usual manner and the spindle of same carrying the toothed segment engaging with the toothed wheel K rotates the free disk, which at the first part of its movement frees the piston from the block on the frame of the machine and allows the ball G to grip, the said ball being impelled into position by the small spiral spring H and the rest of the movement rotates the platen. On releasing the lever handle R it is brought back into its normal or rest position by the spring S on the spindle L; the spiral spring V coiled round inside the bevel wheel K serves to hold the free disk in contact with the abutment J, so that when the platen is raised to examine the writing, the free disk be returned into position of its original gear adjustment.

Having now described my invention, what I claim as new and desire to secure by Letters Patent is:—

1. In improvements in line spacers for type-writing machines, the combination of a platen, a disk revolving upon the platen spindle, a boss having a tapered recess, said boss rotating in the recessed flanged end of the platen, a ball or roller traveling in the tapered recess, a stop on the frame, a release member adapted to engage with the ball on contact with the stop for automatically releasing the ball from the grip and means for limiting the travel of the releasing member.

2. In improvements in line spacers for type writing machines, the combination of a platen, a collar thereon and the spacing lever, of a graduated dial provided with a stop, mounted upon the spacing lever, a lock nut having a handle adapted to lock said dial against the frame of the machine, a pointer fixed to the spacing lever the travel of said pointer being limited by the stop on the dial, a spiral spring fastened to the frame of the machine and spacing lever, a disk fitting into the collar on the platen, a skew beveled segment keyed on said spacing lever and a skew bevel wheel secured to the disk and engaging with the said segment.

In witness whereof I have hereunto set my hand in presence of two witnesses.

JOHN STEPHEN SOUTHERDEN.

Witnesses:
E. GADAN HALL,
C. T. POWERS.